April 17, 1928.  
E. J. HALL  
1,666,494  
FLEXIBLE COUPLING  
Filed Feb. 23, 1926

INVENTOR.  
Elbert J. Hall  
BY  
Drury, Strong, Townsend & Loftus  
ATTORNEYS.

Patented Apr. 17, 1928.

1,666,494

UNITED STATES PATENT OFFICE.

ELBERT J. HALL, OF PIEDMONT, CALIFORNIA.

FLEXIBLE COUPLING.

Application filed February 23, 1926. Serial No. 89,965.

This invention relates to a flexible coupling for drive shafts and the like. In many situations where high-powered gas- or gasoline-engines are employed, and are directly connected to a driven member, it is desirable to provide for a slight amount of flexibility in the drive shaft to accommodate the vibrations. The object of the present invention is to produce a coupling which will be suitable for this purpose and at the same time be inexpensive and durable in construction. This object I accomplish by employing a toothed wheel or disc on adjacent ends of two aligned shafts and arranging a housing over the toothed members, which housing is provided with pin teeth to engage the teeth on the wheels or discs and form a driving connection there-between.

Figure 1:
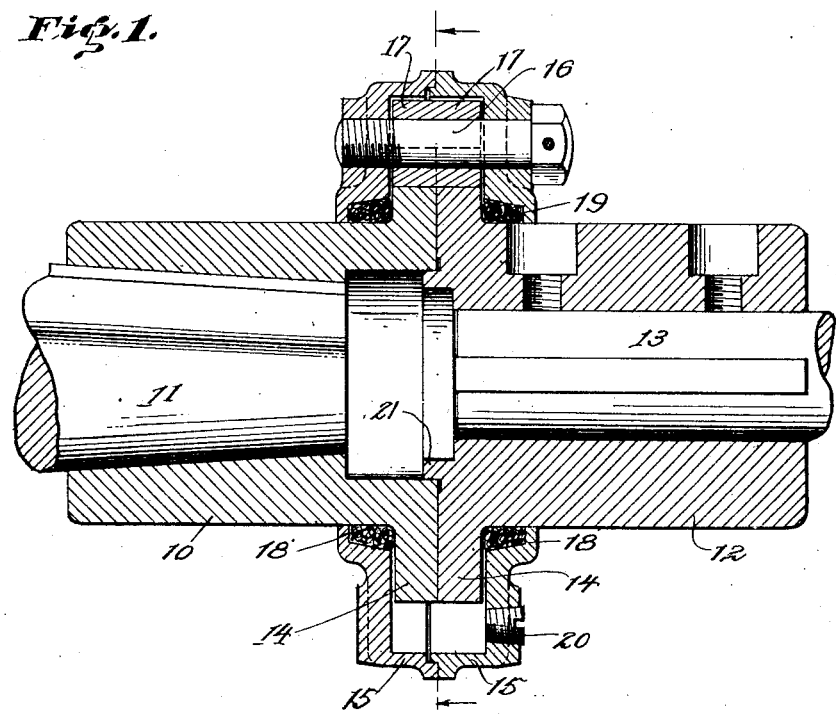
Figure 2:
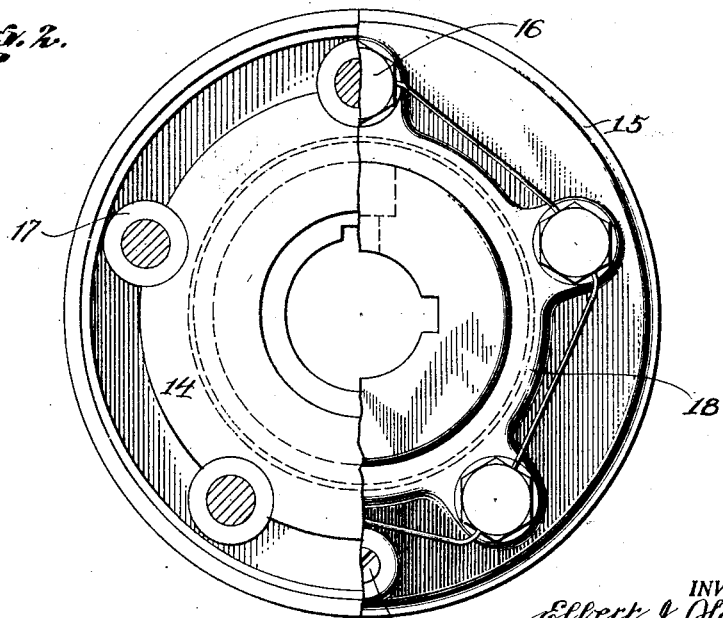

One form which my invention may assume is exemplified in the following description and illustrated in the accompanying drawing, in which Fig. 1 shows a longitudinal sectional view of the coupling; and Fig. 2 shows an end elevation partly in section of the same.

The coupling member as herein illustrated includes a hub member 10 splined upon a shaft 11 and a second hub member 12 splined upon a second shaft 13. Each hub member is formed with a toothed wheel or disc 14, which wheels abut each other and have their teeth in alignment. Surrounding the wheels is a two-part casing 15 whose sides are held together by bolts 16. The two part casing 15 is divided transversely of the coupling and consists of two annular sections which are fitted together beyond the peripheries of the wheels and are connected by the said bolts 16. Preferably each bolt is fitted with a roller or sleeve 17, which rollers or sleeves engage the teeth on the wheels 14. The bolts and sleeves thus serve as pin teeth to transmit rotary motion from one wheel to the other.

The fit of the housing around the wheels may be as loose as required to insure the desired amount of angularity in the shafts. Usually one-eighth to three-eighths inches per foot of shaft is all that is necessary to accommodate the vibrations encountered in practice. Since the casing revolves with the wheels and the hubs, the side walls of the casing may be formed with lips 18 which fit closely against the hubs and form a pocket for packing material 19. Thus the casing can be given an oil-tight fitting upon the hubs and kept filled with grease. A filling plug for the casing is indicated at 20.

The present coupling has been employed with considerable success in the propeller shafts of marine vessels, where it affords the desired flexibility in the drive shaft and replaces more expensive couplings and has a longer life.

The hub 12 is formed with a lip or projection 21 which seats within a depression on the hub 10 and thereby the connected shafts are more substantially in alignment and lateral support is afforded to the coupling members.

The present device is particularly useful where the coupling is liable to come in contact with water, for the reason that the casing can be packed with grease and the grease will be effective to keep the water from the interior of the casing. When the coupling is in operation the centrifugal force will be effective to prevent escape of the grease around the hubs of the discs. The sleeves 17 preferably are of hardened material, to resist wear, and they also serve to space the side walls of the housing to hold them out of contact with the discs.

Various changes in the construction and arrangement of the several parts herein shown and described may be made without departing from the spirit of my invention as disclosed in the appended claims.

Having thus described my invention, what I claim as new and desire to secure by Letters Patent is:

1. In combination with a pair of substantially coaxial shafts, a toothed wheel fixed to each shaft, said toothed wheels abutting each other and having their teeth in alignment, a two-part casing surrounding the wheels, bolts for securing the parts of the casing together, and rollers or sleeves on the bolts engaging the teeth on the wheels.

2. In combination with a pair of substantially coaxial shafts, a hub secured to each shaft, toothed discs formed on each hub, said discs being in abutment with each other, one of said discs having a boss seated in a depression in the other disc, a housing surrounding the discs, and pin teeth formed on the housing, engaging the teeth on the discs.

ELBERT J. HALL.